United States Patent
Ahlstrom et al.

(10) Patent No.: US 6,437,951 B1
(45) Date of Patent: Aug. 20, 2002

(54) ELECTRICAL GROUND FAULT PROTECTION CIRCUIT

(76) Inventors: Michael R. Ahlstrom, P.O. Box 111833, Tacoma, WA (US) 98411; Dennis R. Robbins, 23307 132nd Ave. SE., Kent, WA (US) 98042

(*) Notice: Subject to any disclaimer, the term of this patent is extended or adjusted under 35 U.S.C. 154(b) by 0 days.

(21) Appl. No.: 09/335,259

(22) Filed: Jun. 17, 1999

Related U.S. Application Data
(60) Provisional application No. 60/089,864, filed on Jun. 19, 1998.

(51) Int. Cl.$^7$ ................................ H02H 3/00
(52) U.S. Cl. ........................................ 361/42
(58) Field of Search .................... 361/42–50

(56) References Cited

U.S. PATENT DOCUMENTS

| | | | | |
|---|---|---|---|---|
| 3,886,409 A | * | 5/1975 | Scarpino | 361/48 |
| 4,011,483 A | * | 3/1977 | Meadows | 361/47 |
| 4,441,135 A | * | 4/1984 | Drain | 361/47 |
| 4,507,699 A | * | 3/1985 | Rohm | 361/50 |
| 4,835,651 A | * | 5/1989 | Li et al. | 361/68 |

* cited by examiner

Primary Examiner—Ronald W. Leja
(74) Attorney, Agent, or Firm—Delbert J. Barnard (57) ABSTRACT

The electrical ground fault protection circuit (10) includes power and ground LINE connections (12) that are connectable to power (18a, 18b, 18c) and ground lines of an electrical distribution system. They also include power and ground LOAD connections (14) that are connectable to a load (29). Power and ground paths extend from the power and ground LINE connections to the power and ground LOAD connections and include an interrupter (72) having a connect position in which it allows current flow from the LINE connections to the LOAD connections and a disconnect position in which it interrupts such current flow. A ground line monitor (64) detects the presence or absence of a fault condition in the ground line (20). In response to the presence of a fault condition, the circuit switches the interrupter from its connect position to its disconnect position. The power path monitor (66) detects the presence or absence of a fault condition in the power path (18a, 18b, 18c). In response to the presence of a fault condition in the power path, the circuit switches the interrupter from its connect to its disconnect position. The circuit (10) includes a ground path and plural power paths extending from the power and ground LINE connections to the power and ground LOAD connections (18a, 18b, 18c). A voltage monitor ($VM_{12}$, $VM_{21}$, $VM_3$) is interconnected between each power path and the ground path (20). The monitors detect the presence or absence of a voltage drop in the power path. In response to the presence of a voltage drop of a predetermined amount, the circuit switches the interrupter from its connect position to its disconnect position.

23 Claims, 10 Drawing Sheets

GFS COMPONENT LIST 3 PHASE

| REF. NO. | PART NO. | MANUFACTURE | DESCRIPTION | QUAN. |
|---|---|---|---|---|
| 54a,54b,54c | SM125-115-500 | CARLO GAVAZZI | VOLTAGE SENSOR | 3 |
| 156 | C25FNF360A 3P | CUTLER HAMMER | CONTACTOR | 1 |
| 58 | OETL-NF100 | ABB | DISCONNECT 60 AMP | 1 |
| 68 & 70 | 840-120V | TIME MARK | GROUND LINE MONITOR | 1 |
| 126,136 | EIIC115 20MA | CARLO GAVAZZI ..CS | AMPERAGE SENSOR | 2 |
| F1F2F3 | CCMR 60 | LITTLE FUSE | 60 AMP PRIMARY FUSE | 3 |
| RL4,5,6 | RH1B-UAC120V | IDEC...RL4,5,6 | RELAY | 3 |
| RL1,2,3 | RH2B-UAC120V | IDEC...RL1,2,3 | RELAY | 3 |
| 90 | HW1P-2FH2D-A | IDEC...L1 | PILOT LIGHT (LINE) | 1 |
| 152,153 | HW1P-2FH2D-AG | IDEC...L2,3 | PILOT LIGHT (ON/POWER) | 2 |
| 89,92 | HW1P-2FH2D-R | IDEC...L4,5 | PILOT LIGHT (ERROR/C-H) | 2 |
| 158 | HW1B-M2F10-B | IDEC | PUSH SWITCH 1NO START | 1 |
| 143 | HW1B-M2F01-B | IDEC | PUSH SWITCH 1NC TEST | 1 |
| 154 | BW1B-M2F02-B | IDEC | PUSH SWITCH 2NC RESET | 1 |
| 56 | TA-2-81210 | ACME | TRANSFORMER 480-240/120 | 1 |
| 100a,b,c | B32K510 | SIEMENS...V1,3,5 | VARISTORS | 3 |
| 102a,b,c | S14K680 | SIEMENS...V2,4,6 | VARISTORS | 3 |
| 128 | CR8401-1000 | CR MAGNETICS | CURRENT TRANSFORMER | ? |
| 138 | CR8420-1000 | CR MAGNETICS | CURRENT TRANSFORMER | ? |

GFS COMPONENT LIST 3 PHASE

| REF. NO. | PART NO. | MANUFACTURE | DESCRIPTION | QUANTITY |
|---|---|---|---|---|
| 156 | BE50C4P.P | ABB | CONTRACTOR | 1 |
| 58 | OT63E3 | ABB | DISCONNECT 60 AMP | 1 |
| | CCMR60 | LITTLE FUSE | 60 AMP PRIMARY FUSE | 3 |
| | | RK ELECTRONICS | MEMBRANE SWITCH AND DISPLAY | 1 |
| | | RK ELECTRONICS | TRANSFORMER | 2 |
| 128 | CR8420-1000 | CR MAGNETICS | GROUND CURRENT TRANSFORMER | 1 |
| 138 | CR8490-1140 | CR MAGNETICS | PRIMARY CURRENT TRANSFORMER | 1 |
| | | RK ELECTRONICS | CONTROL AND DISPLAY BOARD | 1 |
| | CCMR.25 | LITTLE FUSE | .25 CONTROL BOARD FUSE | 3 |

FIG.12

ELECTRICAL GROUND FAULT PROTECTION CIRCUIT

RELATED APPLICATIONS

This application claims priority based on provisional application Serial No. 60/089,864, filed Jun. 19, 1998, and entitled "Ground Fault Interrupter."

TECHNICAL FIELD

The present invention relates to electrical equipment that in use is subject to fault conditions that can cause harm to users of the equipment. More particularly, it relates to the provision of an electrical ground fault protection circuit that monitors the electrical equipment and its installation and in response to the detection of a ground fault will disconnect the equipment from its power supply.

BACKGROUND OF THE INVENTION

There are electrical ground fault protection circuits available that detect and provide protection against some electrical fault conditions, such as leakage of current to ground. These circuits are termed ground fault interrupters (GFIs). These protective circuits detect leakage of current to ground by comparing the input current to the output current. This comparison, however, fails to detect all harmful conditions that may occur. For example, if a primary leg of the power source is shorted across the primary ground, standard GFIs will not detect this condition. This is because the input and the output current could remain the same. In addition, known GFI's do not detect an open ground or an elevated voltage on the primary ground or equipment housing.

What is needed is an electrical ground fault protection system that continuously tests for numerous conditions to determine whether one or more conditions exist that could cause harm to a user. The continual testing for potentially harmful conditions would provide desirable safeguards to the user. In addition, the system should alert a user to some harmful condition or conditions before operation is commenced. This would provide an additional safeguard to the user. Herein, the term "user" refers to and includes any and all persons in the vicinity of the equipment and/or potential ground fault condition.

The present invention is directed to the provision of an electrical fault protection system that tests for several conditions to determine whether any individual condition or simultaneous conditions exist that would provide a harmful condition or conditions to the user of the equipment.

An object of the present invention is to detect harmful conditions including 1) current leakage of one of the primary legs; 2) current through the primary ground; 3) voltage leak from a primary leg to primary ground or case ground; 4) open primary ground; 6) lack of ground to work area continuity; and 7) elevated voltage on the work area. By continually testing for these potentially harmful conditions, this invention provides desirable safeguards to the user. In addition, this system alerts a user to some harmful conditions before operation is commenced. This provides an additional safeguard to the user.

BRIEF SUMMARY OF THE INVENTION

The electrical ground fault protection circuit of the present invention is basically characterized by power and ground LINE connections that are connected to power and ground lines of an electrical distribution system and power and ground LOAD connections that are connectable to a load. Power and ground paths extend from the power and ground LINE connections to the power and ground LOAD connections and include an interrupter having a connect position in which it allows current flow from the LINE connections to the LOAD connections and a disconnect position in which it interrupts such current flow.

According to an aspect of the invention, a ground line monitor is provided for detecting the presence or absence of a fault condition in the ground line. In response to the presence of a such a condition, the circuit switches the interrupter from its connect position to its disconnect position. Also, the circuit includes a power path monitor for detecting a fault condition in the power path. In response to the presence of such a fault condition, the circuit switches the interrupter from its connect to its disconnect position.

According to a further aspect of the invention, the circuit includes a plural power paths and a ground path extending from the power and ground LINE connections to the power and ground LOAD connections. A voltage sensor is interconnected between each power path and the ground path. Each voltage sensor detects a voltage drop in the power path. In response to the presence of a voltage drop of a predetermined amount, the circuit switches the interrupter from its connect position to its disconnect position.

In some embodiments, the circuit is connectable to an electrical distribution system that includes three primary legs and a primary ground. The circuit includes three power paths, one for each primary leg, each connected to a separate one of the primary legs, and a ground path connected to the primary ground.

In a preferred embodiment, the circuit includes a transformer connected to receive power from the power paths and to supply power to the voltage sensors.

According to another aspect of the invention, the circuit includes a ground continuity monitor for detecting the ground continuity of the circuit. The circuit may also include an elevated voltage monitor for detecting an elevated voltage at the load that is above a predetermined voltage. In response to the presence of such an elevated voltage, the circuit will switch the interrupter from its connect position to its disconnect position.

A further object of the invention is to provide an electric welding installation that includes an electrical fault protection circuit of the type described.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

Like reference numerals and letters are used to designated like parts throughout the several figures of the drawing, and.

DETAILED DESCRIPTION OF THE INVENTION

Figure 1:
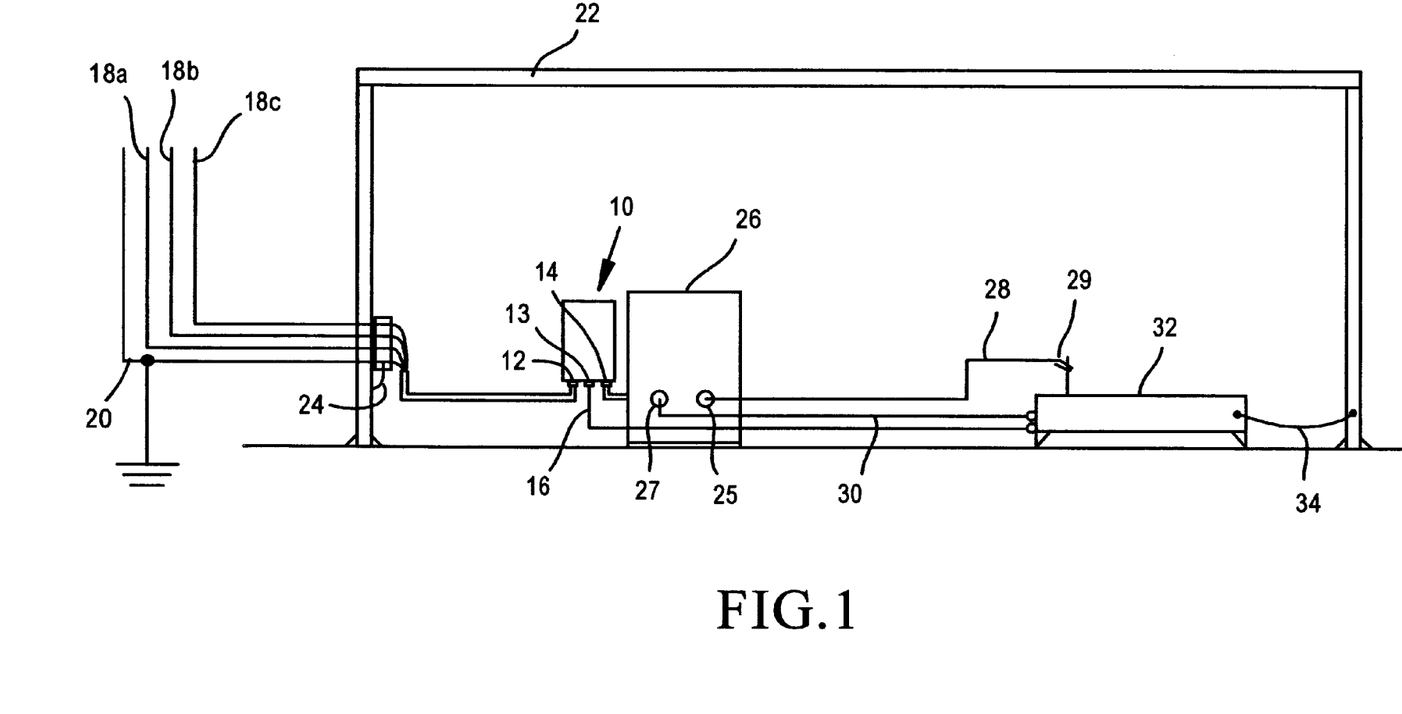
FIG. 1 is a pictorial diagram of an installation of electrical welding equipment in a building, showing the installation connected to power and ground lines of an electrical distribution system and further showing in it an electrical fault protection circuit that exemplifies the present invention, for providing protection to persons that are using or are in the vicinity of the installation.

Referring now to the drawings, in which like reference numerals and letters identify like parts throughout the several views, FIG. 1 shows a pictorial view of a typical installation having a need for the present invention. A welding machine is shown as the load in this installation. However, the present invention has application with other installations having other loads, in either a commercial or residential setting.

In the installation shown in FIG. 1, an electrical ground fault protection system 10 may include a power and ground LINE connection or primary in terminal 12, a ground sense terminal 13, and a power and ground LOAD connection or primary out terminal 14. The LINE connection 12 receives electrical power from primary legs 18a, 18b, 18c and receives primary ground 20. Before the primary ground 20 enters the system 10, the primary ground 20 is attached to a building structure 22, thus creating a building ground 24.

The LOAD connection 14 delivers electrical power and provides a primary ground to a load, such as a welding machine 26 as shown. The welding machine 26 has two terminals 25, 27. One end of a electrode lead 28 attaches from the first terminal 25 and the other end attaches to an electrode 29. The electrode lead 28 delivers the necessary current, either direct current or alternating current, to a work table 32.

A work lead 30 attaches from the second terminal 27 to the work table 32. In certain situations, such as the embodiment shown, a work table ground 34 is attached from the work table 32 to the building structure 22. In these situations, a ground sense lead 16 from the system 10 should be connected to the work table 32. In this configuration, when no fault conditions are present, a normal secondary current flows through the electrode lead 28 and the work lead 30 between the welding machine 26 and the work table 32.

Figure 2:
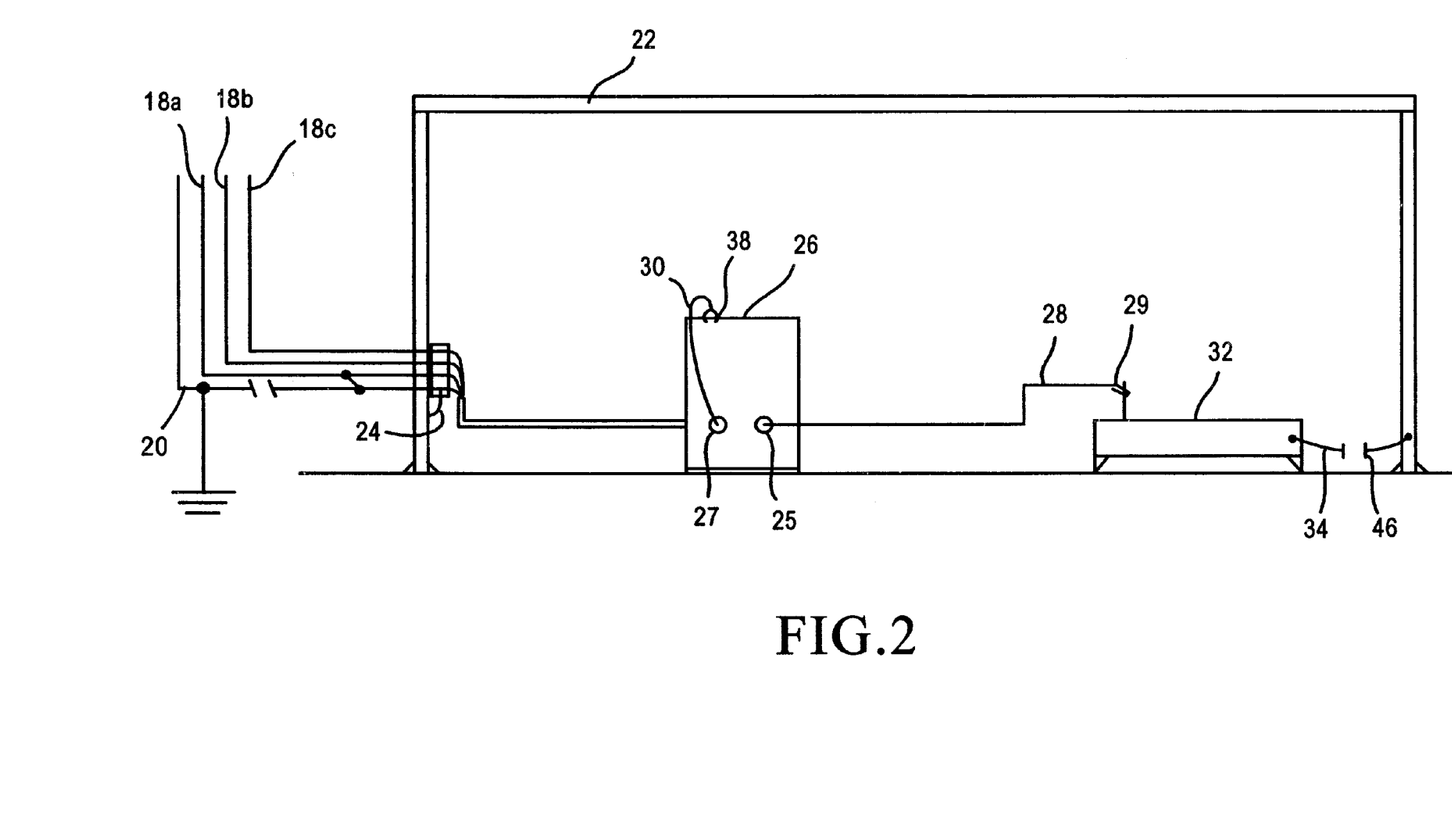
FIG. 2 is a view like FIG. 1 from which the electrical fault protection circuit has been omitted, such view showing some harmful conditions that could occur in the welding machine installation.

Referring now to FIG. 2, a pictorial view showing possible configurations resulting in harmful conditions is depicted with the present invention removed. As would be expected, not all of these conditions would occur at the same time and have only been illustrated in this manner for ease of explanation. As will hereinafter be explained in more detail, the present invention may detect harmful conditions resulting from a single occurrence or simultaneous occurrences of two or more of these individual harmful conditions.

One of such harmful conditions results from an improper grounding hook-up 38 by attaching the work lead 30 to the welding machine 26 rather than the work table 32. In this situation, the path available for the secondary current is from the work table 32 through the work table ground 34, the building structure 22, and then to primary ground 20. This path is undesirable because the current is very large and may bond the primary ground 20 with one of the primary legs 18a, 18b, 18c, thus creating another harmful condition, depicted as a short 42. Or, it may melt a portion of the primary ground 20 wire causing an open primary ground, shown at 44. The short 42 may be from primary ground 20 to any one of the primary legs 18a, 18b, 18c.

Another harmful condition occurs as a result of a simultaneous break 44 occurring in the ground line 20 and a short 42 occurring between the primary ground line 20 and one of the primary legs 18a, 18b, 18c. If this happens, there is no convenient path for the high current and the welding machine housing 26 maintains an elevated voltage condition 48, not shown. A welder or other person in the vicinity may become the path for the high current, resulting in severe injury, most likely death.

Another harmful condition occurs when the work table ground 34 is open, shown at 46. This open condition 46 may result from a missing or improperly connected work table ground 34.

Figure 3:
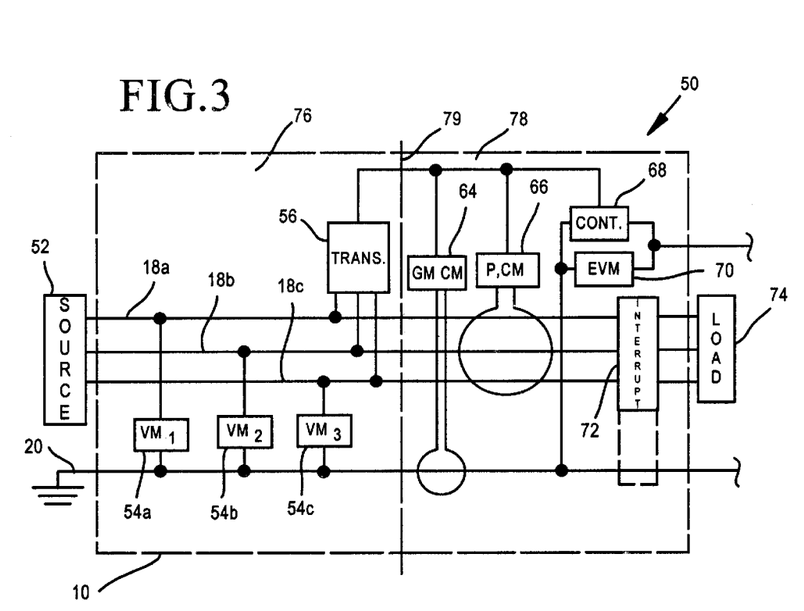
FIG. 3 is a block diagram of a first embodiment of the invention.

Referring now to FIG. 3, therein is shown a block diagram depicting a circuit 50 of the present invention. For ease of explanation, the circuit 50 may be separated by line 79 into a first circuit part 76 and a second circuit part or contactor circuit 78. An electrical power supply source 52 with a plurality of primary legs 18a, 18b, 18c serves as input to the electrical ground fault protection system or circuit 10, shown within the dotted box. The FIG. 3 block diagram shows a power supply source 52 as a three phase system. However, as will become apparent later in the description, the system 10 will operate properly with a single phase power supply source.

The first circuit part 76 includes a transformer 56, voltage sensing devices 54a 54b 54c, and a primary leg indicator light (not shown). This light is shown in and is designated 92 in FIG. 5. Each voltage sensing devices 54a, 54b, 54c receive input from the primary ground 20 and primary leg 18a, 18b, 18c, respectively. Sensors 54a, 54b, 54c detect voltage drop conditions on the primary legs 18a, 18b, 18c. With reference to primary ground 20, they also detect an open primary ground 44 condition. The voltage sensing devices 54a, 54b, 54c are adjustably set for a desired threshold voltage. A transformer 56 receives an input from primary legs 18a, 18b, 18c and supplies power to the voltage sensing devices 54a, 54b, 54c and the contactor circuit 78.

Figure 4:
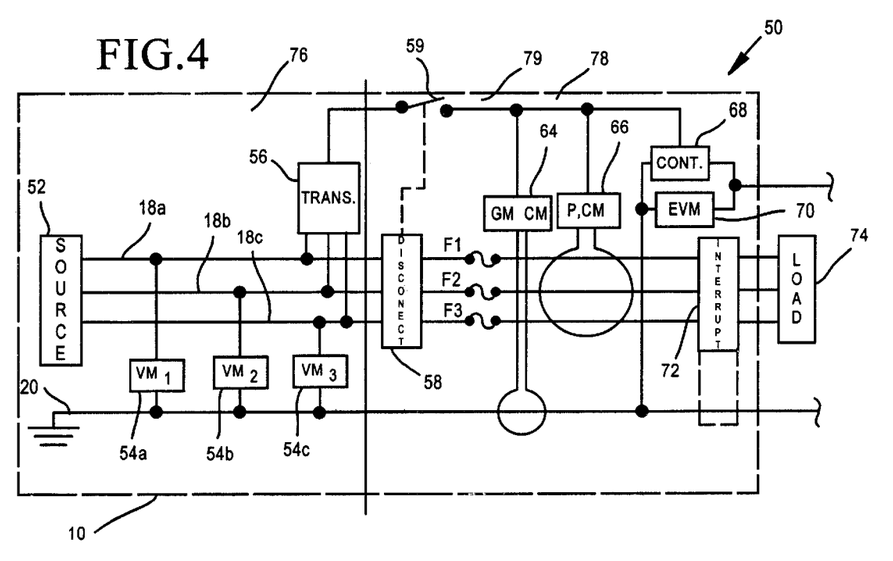
FIG. 4 is a block diagram of a second embodiment of the invention.

In another embodiment, shown in FIG. 4, a disconnect switch 58 controls the operation of the contactor circuit 78. Typically, this disconnect switch 58 is easily accessible to a user and is manually controllable by the user in emergency type situations. However, in certain situations, the disconnect switch 58 is undesirable or unnecessary, such as in residential use. The disconnect switch 58, indirectly through an auxiliary switch 59, controls whether the second circuit part 78 may become operational and capable of supplying power to a load 74 when the user selects a start button. In this embodiment, fuses F1, F2, F3 are positioned between the disconnect switch 58 and the load 74. These fuses are well known in the art.

Figure 5:
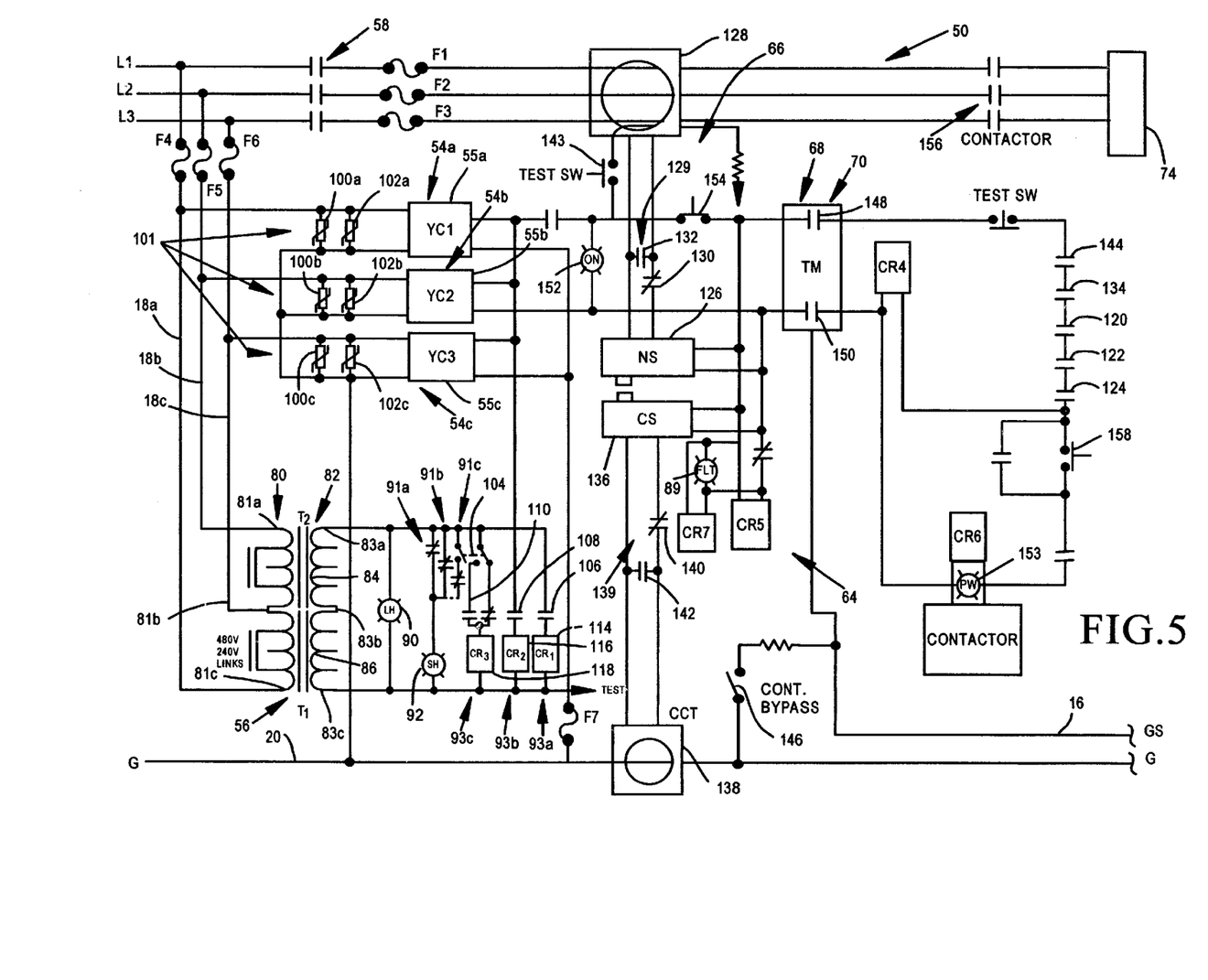
FIG. 5 is a schematic diagram showing the first embodiment in greater detail.

Referring to FIGS. 3 and 4, the contactor circuit 78 includes a primary current leakage monitor 66, a ground current monitor 64, a continuity monitor 68, an elevated voltage monitor 70, an interrupter 72, a power indicator light 90 (FIG. 5), and a fault indicator light 89 (FIG. 5). The ground current and primary current leakage are separately monitored. The ground current monitor 64 detects current in the primary ground 20. The primary current leakage monitors 66 detects current leakage of any one of the plurality of primary legs 18a 18b 18c. The primary current leakage monitor 66 and ground current monitor 64 may detect the err condition using a voltage sensing device or a current sensing device. A continuity monitor 68 detects the ground continuity of the system 10, such as the open work table ground 46 condition. An elevated voltage monitor 70 detects an elevated voltage 48 on the work area. If any of these devices or monitors 54a, 54b, 54c, 64, 66, 68, 70 detect an err condition, the interrupter 72 disconnects the power source 52 from the load 74. As indicated by broken lines in FIGS. 3 and 4, the interrupter may be extended to include the ground path. That is, when the interrupter disconnects the power source from the load, it also opens the ground parts.

Now referring to FIG. 5, an embodiment of the circuit 50 is shown in greater detail in this schematic diagram. In the first circuit part 76, the transformer 56 is a three phase transformer wired as an open delta. The primary winding 80 receives the primary legs 18a, 18b, 18c at each of three nodes 81a 81b 81c. The secondary winding 82 having three nodes 83a, 83b, 83c, thus has three legs 84, 86, 88 (88 not shown). The secondary winding 82 is tapped across one leg 88 which extends from node 83a to node 83c. A fuse F7 is between primary ground 20 and the node 83c. Because the same voltage is available on any of the legs, if one of the primary legs 18a, 18b, 18c is lost at the source, the voltage across the secondary winding 82 is maintained. Configured in this manner, the transformer 56 does not have to be retapped to operate with a single phase source. For example, with a single phase source, even though only primary legs 18a and 18b are active, the voltage across the secondary winding 82 maintains the desired voltage to operate the circuit components.

In the embodiment including the disconnect switch 58, by designing the transformer 56 and the voltage sensing devices 54a, 54b, 54c to be positioned before the disconnect switch 58, the system 10 can detect some harmful shock hazard type of conditions before the system 10 is allowed to deliver power to the load 74. Therefore, this system 10 may provide additional safeguards to the user. In a further embodiment, once a certain shock hazard type of condition is detected, the primary ground 20 may be disconnected within the system 10.

The voltage sensing devices, shown generally at 54a, 54b, 54c, include a voltage sensing circuit 55a, 55b, 55c, a shock hazard enabling circuit 91a, 91b, 91c, and a contactor enabling circuit 93a, 93b, 93c. In the embodiment shown, the shock hazard enabling circuits 91a, 91b, 91c are parallel relays RL1, RL2, R13 in series with a shock hazard indicator light 92.

In the embodiment shown, the contactor enabling circuits 93a, 93b, 93c use well known devices that interact with the interrupter 72 component in the contactor circuit 78. Each contactor enabling circuit 93a, 93b, 93c includes a relay 106, 108, 110 and coils 114, 116, 118.

Figure 6:
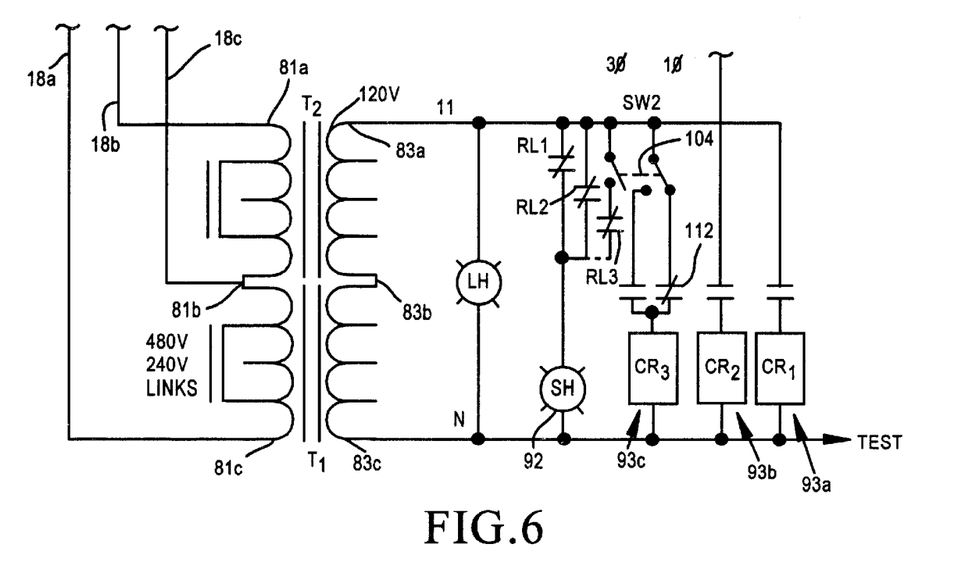
FIG. 6 is an enlarged scale view of the lower left corner portion of FIG. 5.

FIG. 6 shows an enlarged scale view of a portion of the schematic used for selecting either a single phase or three phase power source. To provide operation for single and three phase power sources, phase selector switch 104 allows a user to select whether the power source 52 is single phase or three phase. The contactor enabling circuit 93c for primary leg 18c includes a closed relay 112 which may be operably selected by a corresponding position of the phase selector switch 104. If single phase is selected, the phase selector switch 104 completes the circuit thru the closed relay 112. Therefore, a third leg contact 124 (not shown), associated with contactor enabling circuit 93c, remains closed so that the contactor circuit 78 does not open. In addition, in single phase, the phase selector switch 104 will open the circuit through relay RL3, thus preventing the shock hazard indicator 92 from illuminating due to no voltage on primary leg 18c.

Referring back to FIG. 5, a device suitable for use as the voltage sensing device 54a, 54b, 54c is available as model SM 125 115 500 1-Phase AC/DC Voltage—AC Current Control Relays from Carlo Gavazzi Inc. of Buffalo Grove, Ill. or a Schmitt Trigger such as used in a model VoltAlert™ 1AC AC line voltage detector from Fluke Corp. of Everett, Wash. If an SM 125 device, or a similar device, is selected, a separate continuity circuit is not needed because the SM 125 provides continuity enabling along with the voltage sensing circuit. However, if a Schmitt Trigger device, or another voltage sensing device, is used, a separate contactor enabling circuit is necessary. Suitable contactor enabling circuits are well known in the art.

The voltage sensing devices 54a, 54b, 54c have two inputs: one of the primary legs 18a, 18b, 18c and primary ground 20.

Across the inputs to each of the voltage sensing devices 54a, 54b, 54c is a voltage protection device 101. In the embodiment shown, the voltage protection device 101 includes two stacked varistors 100, 102. These stacked varistors clamp off harmful voltages and passes current thru the varistor so that only the desired voltage is on the inputs to the voltage sensing devices.

In preferred form, a first varistor 100a, 100b, 100c is rated at a voltage to be limited, a limiting voltage, and handles up to a somewhat higher voltage, a clamping voltage. A second varistor 102a, 102b, 102c is rated with a limiting voltage just below the clamping voltage of the first varistor 100a, 100b, 100c and has a considerably higher clamping voltage. In this configuration, the stacked varistors 100 102 protect the voltage sensing devices 54a, 54b, 54c when one of the primary legs 18a, 18b, 18c shorts to ground resulting in double the voltage across the inputs to the corresponding voltage sensing device. The second varistor 102a, 102b, 102c, in essence, protects the corresponding first varistor 100a, 100b, 100c from damage during this condition and thereby, the combination restricts the voltage without resulting damage to the circuit 50.

Figure 7:
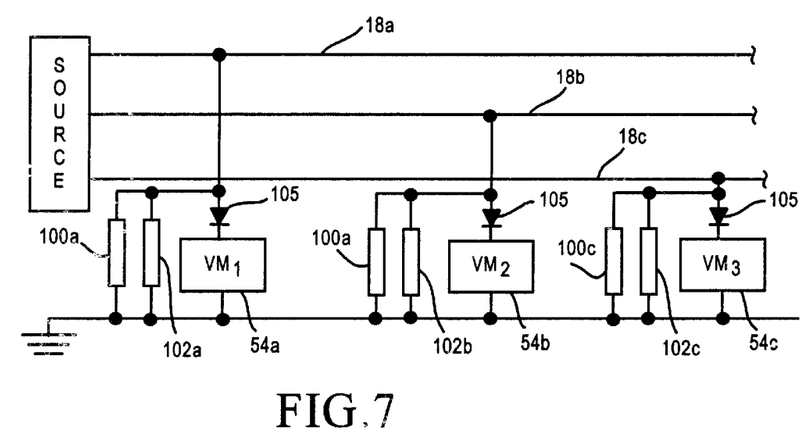
FIG. 7 shows a portion of the circuit shown by FIG. 5 but with an alternative embodiment of the arrangement of voltage sensors between the primary legs of the power supply and the primary ground line.

In an alternative embodiment, shown in FIG. 7, the primary leg 18a, 18b, 18c input of the voltage sensing devices 54a, 54b, 54c may have its input half-wave rectified. A well-known suitable device for performing this function is a diode 105. This embodiment increases the sensitivity especially unbalanced lines.

Referring back to FIG. 5, the transformer 56 also provides power to the contactor circuit 78. As mentioned previously, the contactor circuit 78 includes a primary current leakage monitor 66, a ground current monitor 64, a continuity monitor 68, an elevated voltage monitor 70, an interrupter 72, a power indicator light 153, a system on indicator light 152, and a fault indicator light 89. The interrupter 72 includes a first leg contact 120, a second leg contact 122, a third leg contact 124, a primary leakage contact 134, and a ground current contact 144.

In the contactor circuit 78, the primary current leakage monitor, shown generally at 66, includes a primary current sensor 126, a primary current transformer 128, and a primary current protector device 129. This monitor 66 has an associated primary leakage contact 134 in the interrupter 72. Two inputs Y1, Y2 on the primary current sensor 126 receives a current level from the primary current transformer 128. The primary current protector device 129 includes a primary closed relay 130 on the input Y2 and a primary open relay 132 connected between the two inputs Y1, Y2. Because an err condition current may be significantly higher than the trip current, this large current through inputs Y1, Y2 would damage the primary current sensor 126. Therefore, the relays 130, 132 protect the sensor 126 and the transformer 128. In preferred form, the relays will latch. A device suitable for use as the primary current transformer 128 is available from well known manufacturers.

Similarly, the ground current monitor, shown generally at 64, includes a ground current sensor 136, a ground current transformer 138, and a ground current protector device 139. This monitor 64 has an associated ground current contact 144 in the interrupter 72. Two inputs Y1, Y2 on the ground current 35 sensor 136 receives a current level from the ground current transformer 138. The ground current protector device 139 includes a ground closed relay 140 on the input Y2 and a ground open relay 142 connected between the two inputs Y1, Y2. Because an err condition current may be significantly higher than the trip current, this large current through inputs Y1, Y2 would damage the ground current sensor 136. Therefore, the relays 140, 142 protect the sensor 136 and the transformer 138. In preferred form, the relays will latch. A device suitable for use as the ground current transformer 138 is available from well known manufacturers.

Both the continuity monitor and the elevated voltage monitor, shown together generally at 68 and 70, include a trip device having an associated contact 148 150 (FIG. 5). The contacts 148 150 may be part of the interrupter 72. In the embodiment shown, a device suitable for use as the continuity monitor 68 and the elevated voltage monitor 70 is available as model 840 Ground Line Integrity Monitor from Time Mark Corp. of Tulsa, Okla.

Input to the monitors 68, 70 is the ground sense lead 16 having a combined internal 1M Ohm resistance. The 1M Ohm resistance provides an additional safety feature for the ground sense lead. For instance, if there is an elevated voltage condition, the 1M Ohm resistance will decrease the current flow through a user in contact with the elevated voltage condition 48. If there is continuity and no elevated voltage, the monitors 68, 70 switch to complete the remaining contact circuit 78 which includes the contacts 120, 122, 124, 134, 144 arranged in series. Thus, any contact that opens, due to an err condition, will disconnect the power source 52 to the load.

In another embodiment, in which a work table ground 34 is not available or used, a ground by-pass switch 146 is operably positioned between the primary ground 20 and the ground sense lead 16. This ground by-pass switch 146, thus affects the input to the continuity monitor 68 and the elevated voltage monitor 70. When closed, a resistor R2 having a suitable resistance, such as 800K, allows continuity detection to be disabled but the elevated voltage detection to be enabled.

A device suitable for use as the indicator lights is well known in the art.

The contactor enabling circuit 93 and the shock hazard enabling circuit 71 may include electro-mechanical devices, e.g. relays, and solid state switching arrangements or any other non-linear response type device.

Figure 8:
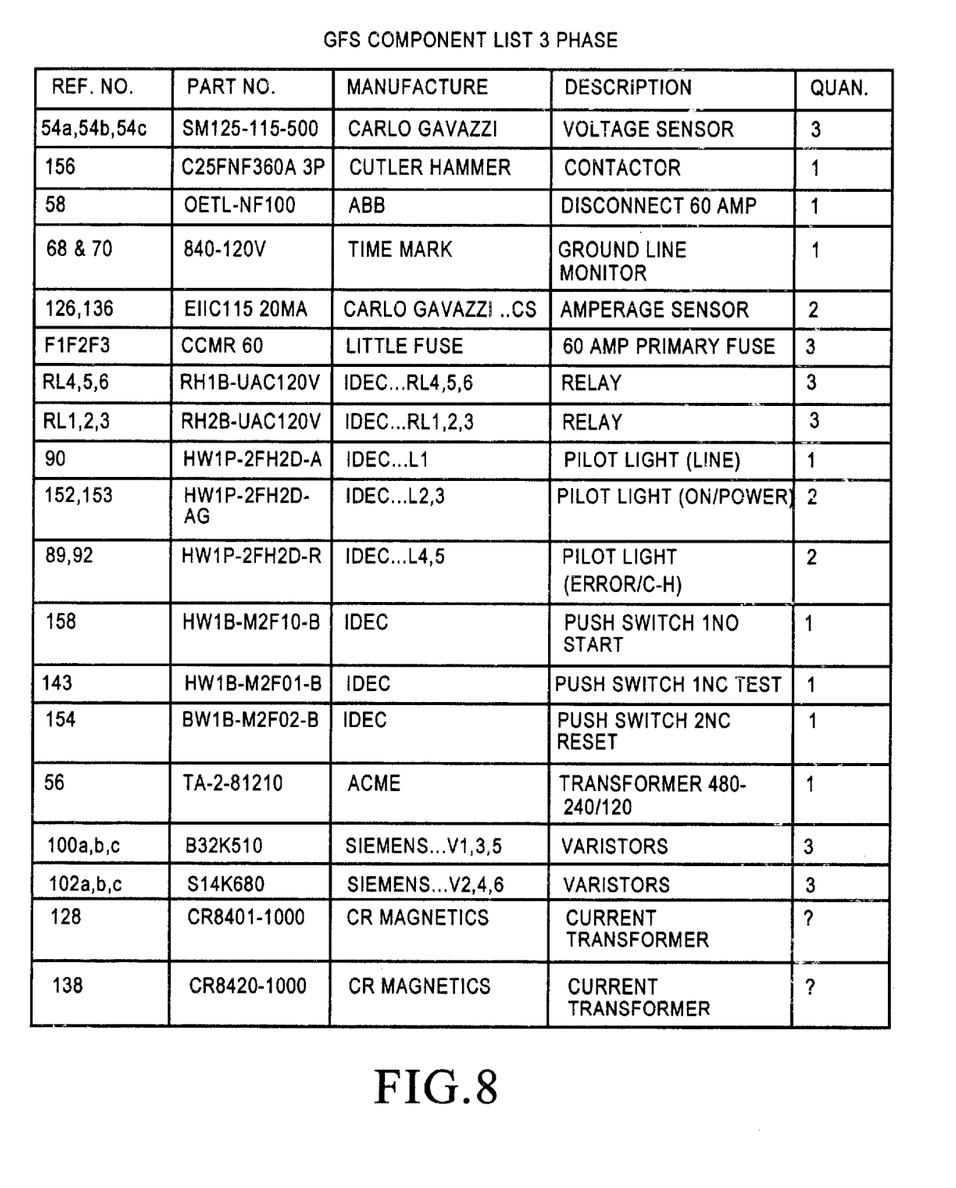
FIG. 8 is a table that identifies most of the components that are in FIG. 5.

The values of the components may be selected so that each of the above described harmful conditions are adequately detected. In one example circuit, components with the following values were used: three phase input 480v Y system with ground tapped; transformer 56 as 480-240/120; varistors 100a 100b, 100c clamp voltage of 385; varistors 102a 102b 102c clamp voltage of 550; voltage sensing devices 54a 54b 54c set at 277V; ground current monitor 64 set to trip between a range of 2–200 mA depending on the need to compensate for nuisance tripping, preferably at <20 mA; primary current leakage monitor set between a range of 2–200 mA depending on the need to compensate for nuisance tripping; elevated voltage monitor set to trip at 15V potential; and R1 at 1200 Ohms. FIG. 8 is a table showing a component list with corresponding reference numbers.

Figure 9:
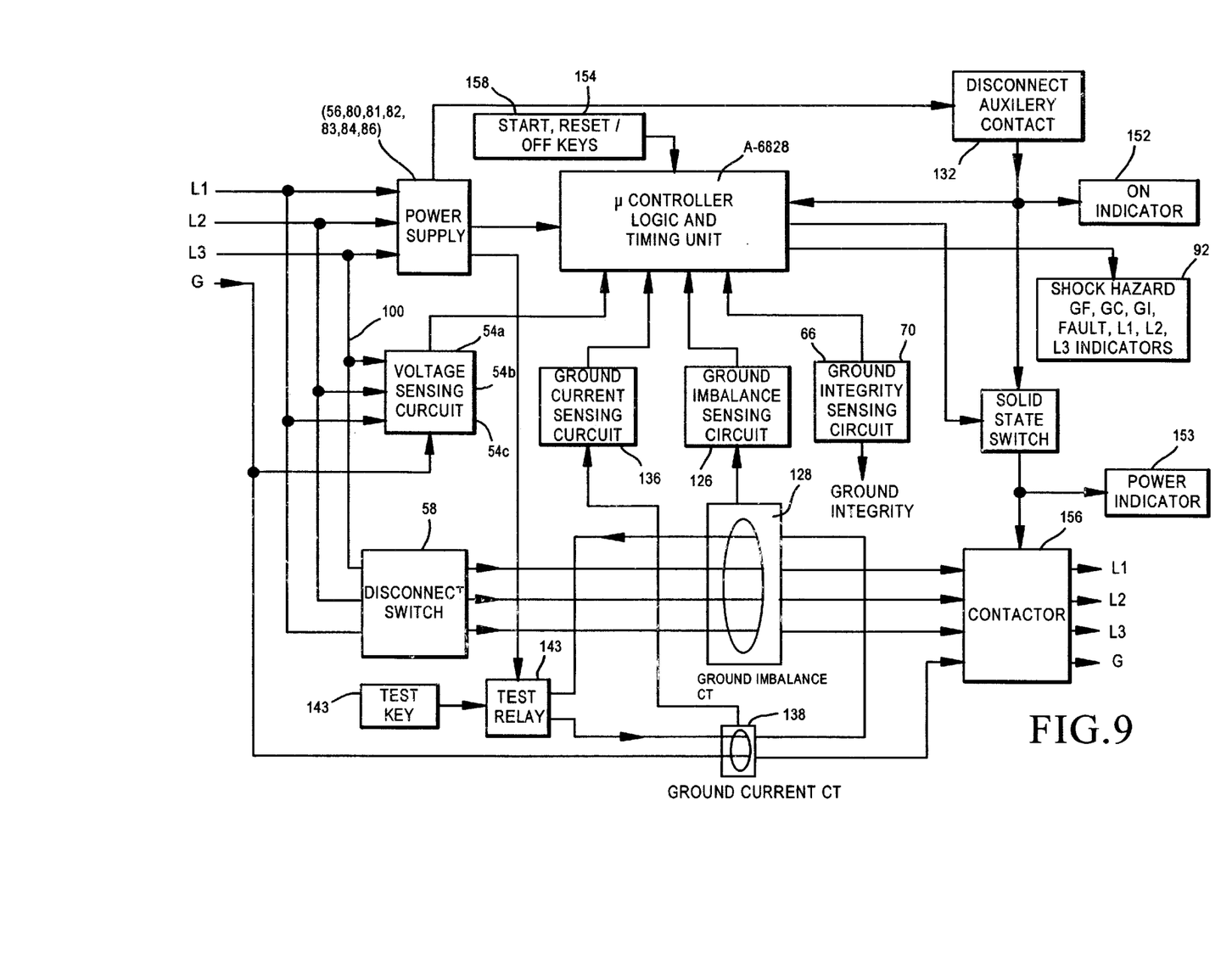
FIG. 9 is a schematic diagram of a modified arrangement of the circuit shown by FIG. 5, such view showing a preferred way of positioning the components of the circuit on a supporting circuit board.
Figure 10:
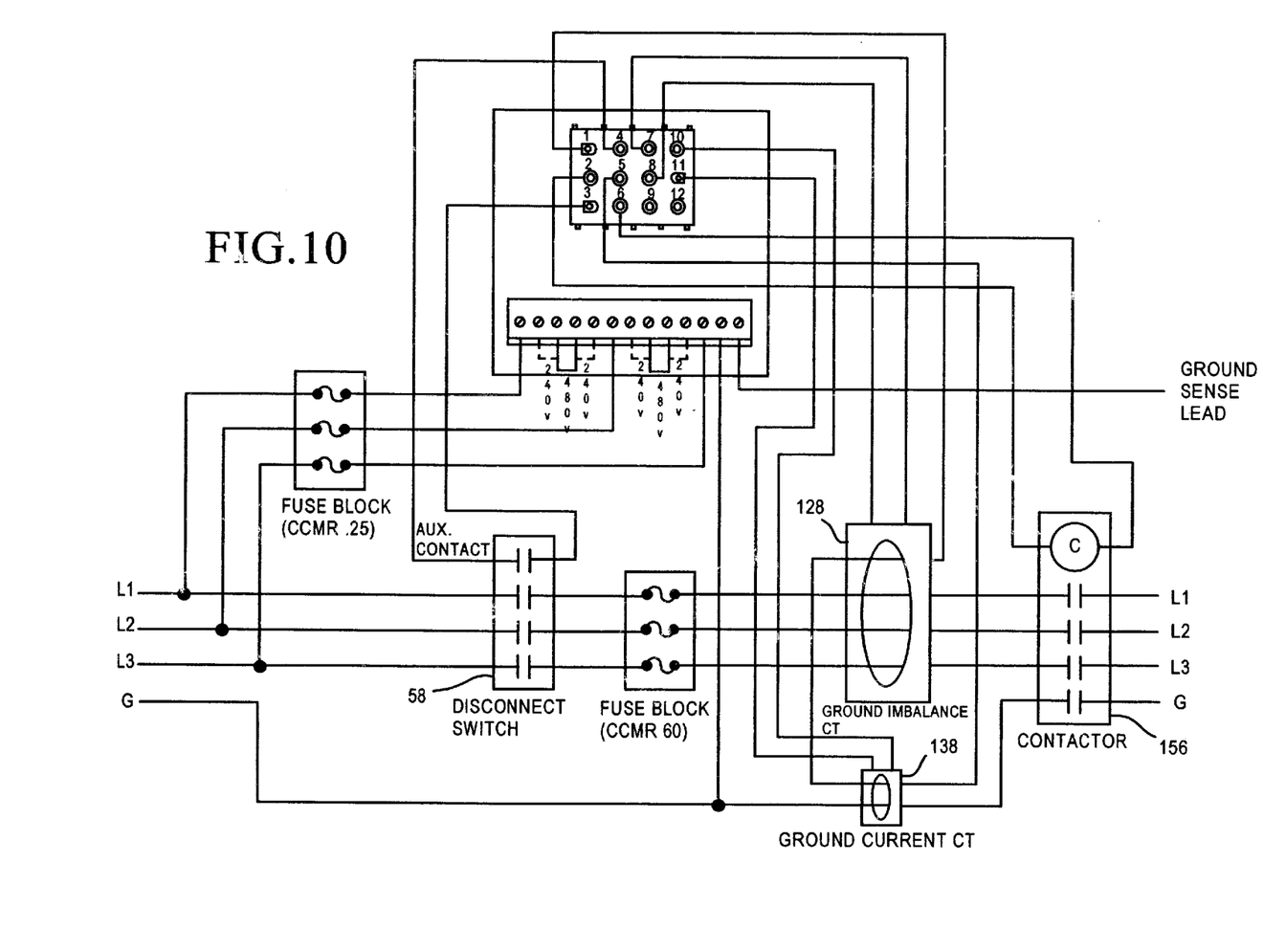
FIG. 10 is a schematic diagram identifying components in the circuit of FIG. 9.

FIGS. 9 and 10 are schematic diagrams of a preferred circuit layout. Some components are shown in both FIG. 9 and FIG. 10. Some are shown only in FIG. 9. Others are shown only in FIG. 10. A key component of this circuit is the logic and timing unit A-6828. This CPU replaces hard circuit components shown in FIG. 5.

Figure 11:
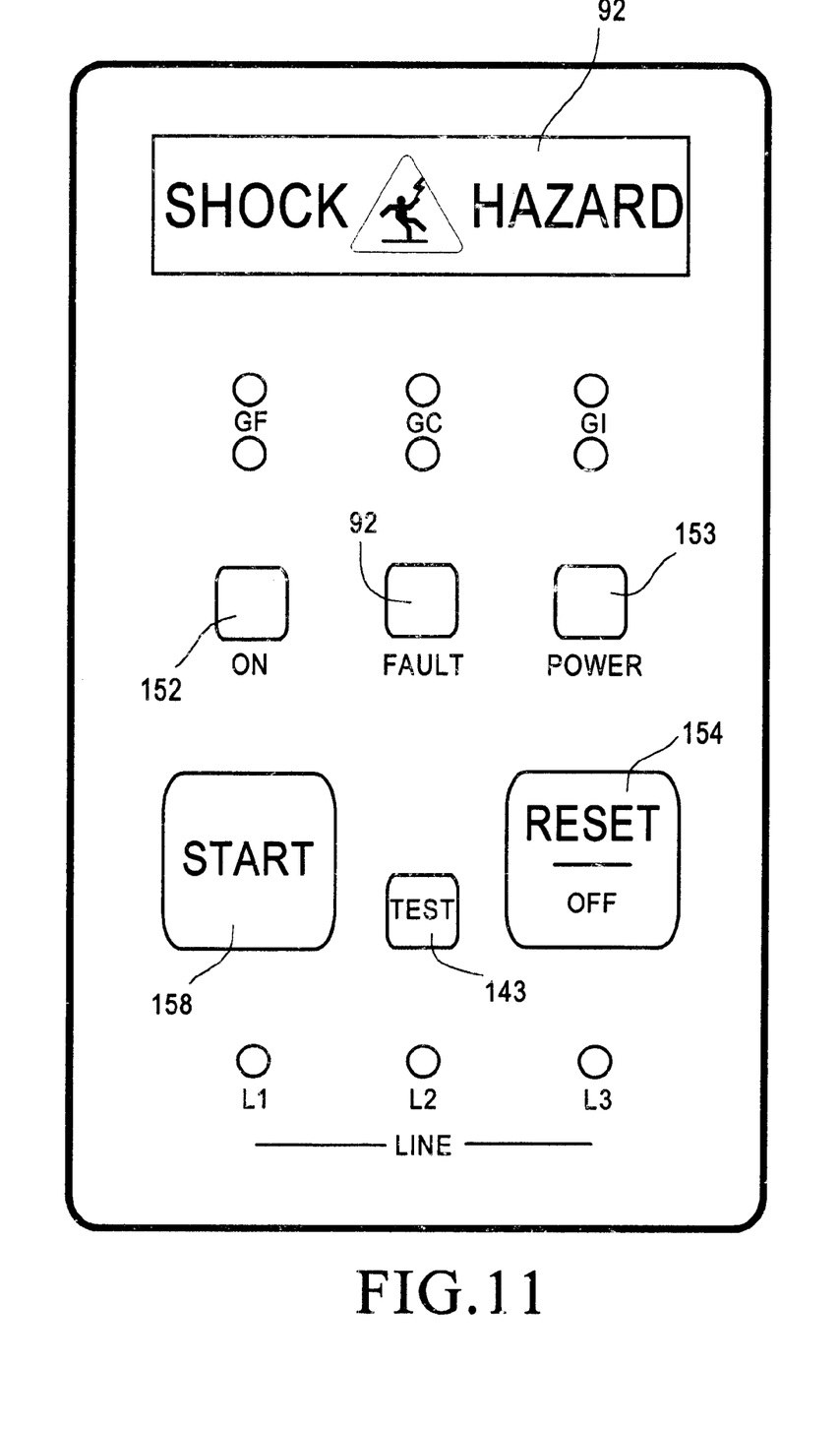
FIG. 11 is a front view of a control panel.
Figure 12:
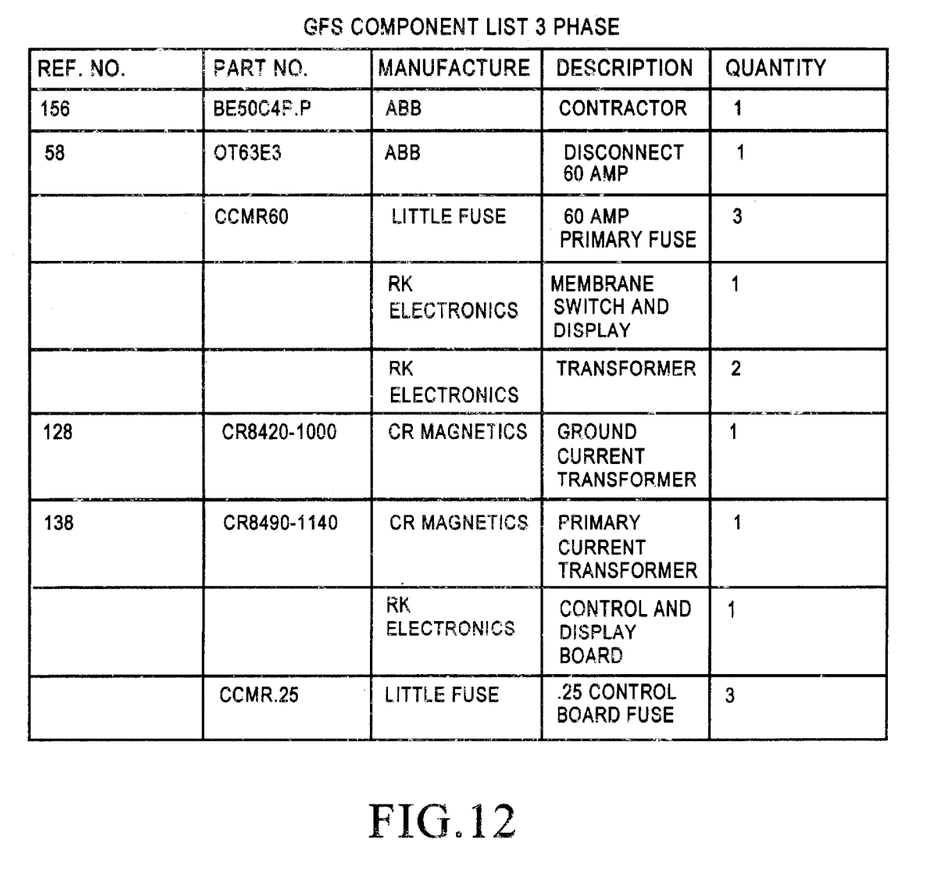
FIG. 12 is a component table like FIG. 8, but identifying components shown by FIGS. 9 and 10.

FIG. 11 shows one form of control panel. It shows "Start", "Test" and "Resent/off" buttons and several indicator lights. At the top of the panel there is a "shock hazard" light. This light is normally off. It goes on when there is a shock hazard condition. Below the "shock hazard" light there are six small lights, two associated with GF, two associated with GC and two associated with GI. The top row of lights are green. The bottom row are red. When conditions are normal, the green lights are on. They show that the monitors are in operation. In their is a ground fault (GF), the green light above "GF" goes off and the red light below "GF" goes on. If there is a ground current fault, the green light above "GC" goes off and the red light below "GC" goes on. If there is a unfavorable ground integrity condition, the green light above "GI" goes off and the red light below "GI" goes on. The on light 152 is on when the system is on. The fault light 92 is on when there is a fault condition. The power light 153 is on when there is power to the system. Element 158 is a start button. Element 154 is a reset/off button. Element 153 is a test light. It is on when the circuit is being tested. At the bottom of the panel there are three lights, one above "Li", one above "L2" and one above "L3." These lights may be amber in color. When there is a short in the power supply, all three lights are off. When the system is connected to single phase, lights "Li" and "L2" are on and light "L3" is off. When the system is connected to a three phase power supply, all three lights "Li", "L2" and "L3" are on.

In operation, in the embodiment including the disconnect switch 58 with the disconnect switch 58 open, the user selects either a single phase or a three phase on the phase selector switch 104. Once the primary legs 18a, 18b, 18c and primary ground 20 are connected to the primary in terminal 12 of the electrical ground fault system 10, the primary leg indicator light 90 is illuminated and the transformer 56 provides power to the voltage sensing devices 54a, 54b, 54c. If three phase is correctly selected and there is no open primary ground 44 or voltage leak from a primary leg 42, relays RL1, RL2, RL3 open and the shock hazard indicator light 92 remains off. If single phase is incorrectly selected, the contactor enabling circuit 73c would cause the contactor circuit 78 to open at the third leg contact 124 once powered on. A similar result occurs if the power source 52 is single phase and three phase was selected with the phase selector switch 104.

Once the disconnect switch 58 is closed and a start button 158 is pressed, a relay RL6 closes and the system on indicator 152 and system power indicator 153 is illuminated. If there are no fault conditions, the contactor circuit 78 is closed and power is delivered to the load 74.

If there is a current leakage of one of the primary legs 18a, 18b, 18c, the primary current leakage monitor 66 will detect the err and open the associated primary leakage contact 134. Similarly, if there is current through the primary ground 20, the ground current monitor 64 will detect the err and open the associated ground current contact 144.

If the work table ground 34 is open, (condition 34), and the ground by-pass switch 146 is either open or not part of the configuration, the continuity monitor 68 will detect the err and open the associated continuity contact 150. Similarly if there is an elevated voltage on the load 74, (condition 48), the elevated voltage monitor 70 will detect the err and open the associated elevated voltage contact 148.

For each of the above errs, once the associated contact is opened, CR4 drops out and relay RL4 closes resulting in the illumination of the fault indicator 89. The power to the load 74 is stopped by power supply contacts 156 and system power indicator 153 is turned off. A reset button 154 is pushed before the contactor circuit 78 may become operational.

If either a voltage leak from one of the primary legs 18a, 18b, 18c to primary ground 20 (condition 42), or the primary ground 20 is open (condition 44), the voltage sensing devices 54a, 54b, 54c will detect the condition, thereby opening the associated contacts 120, 122, 124 and similarly illuminating the fault indicator 92 and removing power to the load 74. In addition, the corresponding relay RL1, RL2, RL3 will close causing the shock hazard indicator light 92 to illuminate.

Once the err is removed, the fault indicator 92 turns off, the contacts are closed, and the circuit 50 is operational. The start button 158 must then be pushed to start the system 10.

If a user pushes the start button 158 while in the fault condition, the contactor circuit 78 will be opened and the load will not receive power.

As one skilled in the art would recognize, in the embodiment with the disconnect switch 58, the system 10 would operate if the voltage sensing devices 54a, 54b, 54c and transformer 56 were after the disconnect switch 58. However, in this arrangement, the additional shock hazard indicator 92 would not be available until after the system 10 was switched on. In addition, the indicator lights are a matter of preference for alerting users to the type of condition. Other indicator mechanisms may by preferable given individual situations, such as audible alerts, readable messages.

In preferred form, the ground sense lead 16 is 25 feet with a well-known industry standard ground clamp. In preferred form a plurality of components of the circuit 100 are designed on a printed circuit board mounted behind a front access door of the ground fault protection system 10.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. An electrical ground fault protection circuit, comprising:
   at least one power LINE connection and a ground LINE connection, said power and ground LINE connections being connectable to power and ground lines of an electrical distribution system;
   at least one power LOAD connection and a ground LOAD connection, said power and ground LOAD connections being connectable to a load;
   a power path extending from said power LINE connection to said power LOAD connection, and a ground path extending from the ground LINE connection to the ground LOAD connection;
   an interrupter in the power path and in the ground path, having a connect position in which it allows current flow through the path and a disconnect position in which it interrupts such current flow;
   a ground line monitor for detecting the presence or absence of a ground fault condition in the ground path, and in response to the presence of a such a condition, switching the interrupter from its connect position to its disconnect position; and
   a power path monitor for detecting the presence or absence of a ground fault condition in the power path, and in, response to the presence of such a fault condition, switching the interrupter from its connect position to its disconnect position, said power path monitor including a voltage drop monitor interconnected between the power path and the ground path, for detecting a voltage drop in the power path, and in response to the presence of a voltage drop of a predetermined amount, switching the interrupter from its connect position to its disconnect position.

2. The electrical fault protection circuit of claim 1, wherein the voltage drop monitor includes a voltage sensor.

3. The electrical fault protection circuit of claim 1, wherein the power path monitor includes a current leakage monitor.

4. The electrical fault protection circuit of claim 1, further comprising a ground continuity monitor for detecting the ground continuity of the circuit.

5. The electrical fault protection circuit of claim 1, further comprising an elevated voltage monitor for detecting an elevated voltage that is above a predetermined voltage and in response to such an elevated voltage will switch the interrupter from its connect position to its disconnect position.

6. An electrical ground fault protection circuit, comprising:
   a plurality of power LINE connections and a ground LINE connection, said power and ground LINE connections being connectable to power and ground lines of an electrical distribution system;
   a power LOAD connection for each power LINE connection and a ground LOAD connection, said power and ground LOAD connections being connectable to a load;

a separate power path extending from each power LINE connection to a related power LOAD connection, and a ground path extending from the ground LINE connection to the ground LOAD connection;

an interrupter in each power path and in the ground path, having a connect position in which it allows current flow through the path and a disconnect position in which it interrupts such current flow;

a ground line monitor for detecting the presence or absence of a ground fault condition in the ground path, and in response to the presence of such a condition, switching the interrupter from its connect position to its disconnect position; and a power path monitor for detecting the presence or absence of a ground fault condition in a power path, and in response to the presence of such a fault condition, switching the interrupter from its connect position to its disconnect position, said power path monitor including a voltage drop monitor interconnected between each power path and the ground path, for detecting a voltage drop in the power path and, in response to the presence of a voltage drop of a predetermined amount, switching the interrupter from its connect position to its disconnect position.

7. The electrical fault protection circuit of claim 6, comprising a transformer connected to receive power from the power paths and to supply power to the voltage drop monitors.

8. The electrical fault protection circuit of claim 6, connectable to an electrical distribution system that includes three primary legs and a primary ground, wherein said circuit includes three power paths, one for each primary leg, each connected to a separate one of the primary legs, and a ground path connected to the primary ground.

9. The electrical fault protection circuit of claim 8, comprising a voltage sensor interconnected between each power path and the ground path, for detecting a voltage drop in the power path, and in response to the presence of a voltage drop of a predetermined value, switching the interrupter from its connect position to its disconnect position.

10. The electrical fault protection circuit of claim 9, comprising a transformer connected to receive power from the power paths and to supply power to the voltage sensors.

11. The electrical fault protection circuit of claim 6, wherein the power path monitor detects current leakage in any one of the primary legs, and the ground line monitor detects the presence of a current in the ground path.

12. The electrical fault protection circuit of claim 11, further including the ground path extending from the ground LINE connection to the ground LOAD connection, and wherein the interrupter when in its connect position provides a ground path from the ground LINE connection to the ground LOAD connection, and in its disconnect position opens the ground path.

13. An electrical ground fault protection circuit, comprising:

power and ground LINE connections that are connectable to an electrical distribution system that includes primary legs and a primary ground;

power and ground LOAD connections that are connectable to a load;

power and ground paths extending from the power and ground LINE connections to the power and ground LOAD connections and including a power path for each primary leg and a ground path, and an interrupter having a connect position in which it allows current flow from the LINE connections to the LOAD connections and a disconnect position in which it interrupts such current flow;

a voltage drop monitor interconnected between each power path and the ground path, for detecting a voltage drop in the power path, and in response to the presence of a voltage drop of a predetermined amount, switching the interrupter from its connect position to its disconnect position; and a ground line monitor for detecting the presence or absence of a ground fault condition in the ground path, and in response to the presence of such condition, switching the interrupter from its connect position to its disconnect position.

14. The electrical fault protection circuit of claim 13, comprising a transformer connected to receive power from the power paths and to supply power to the voltage drop monitors.

15. In a building having a building ground, an electric welding machine including an electrode, an electrode lead, a work table and a work table lead, and an electrical fault protection circuit, comprising:

at least one power LINE connection and a ground line connection, said power and ground line connections being connectable to power and ground lines of an electrical distribution system;

at least one power LOAD connection and ground LOAD connection, said power and ground LOAD connections being connectable to the electrode lead and the work table lead of the welding machine;

a power path extending from said power line connection to said power LOAD connection, and a ground path extending from the ground LINE connection to the ground load connection;

a power path interrupter in the power path having a connect position in which it allows current flow through the power path and a disconnect position in which it interrupts such current flow;

a ground path interrupter in the ground path having a connect position in which it allows current flow through the ground path and a disconnect position in which it interrupts such current flow;

a ground line monitor for detecting the presence or absence of a fault condition in the ground line, and in response to the presence of such a condition, switching the interrupter from its connect position to its disconnect position; and a power path monitor for detecting the presence or absence of a fault condition in the power path and in response to the presence of such a fault condition switching the power path interrupter from its connect to its disconnect position, said power monitor including a voltage drop monitor interconnected between the power path and the ground path, for detecting a voltage drop in the power path and, in response to the presence of a voltage drop of a predetermined amount, switching the interrupter from its connect position to its disconnect position.

16. The electrical fault protection circuit of claim 15, comprising said ground path and a plurality of power paths extending from the power and ground LINE connections to the power and ground LOAD connections, and a voltage drop monitor including a voltage sensor interconnected between each power path and the ground path, for detecting a voltage drop in the power path, and in response to the presence of a voltage drop of a predetermined amount, switching the interrupter from its connect position to its disconnect position.

17. The electrical fault protection circuit of claim 16, comprising a transformer connected to receive power from the power paths and to supply power to the voltage sensors.

18. The electrical fault protection circuit of claim 15, connectable to an electrical distribution system that includes three primary legs and a primary ground, wherein said circuit includes three power paths, one for each primary leg, each connected to a separate one of the primary legs, and a ground path connected to the primary ground.

19. The electrical fault protection circuit of claim 18, comprising a voltage drop monitor including a voltage sensor interconnected between each power path and the ground path, for detecting a voltage drop in the power path, and in response to the presence of a voltage drop of a predetermined value, switching the interrupter from its connect position to its disconnect position.

20. The electrical fault protection circuit of claim 19, comprising a transformer connected to receive power from the power paths and to supply power to the voltage sensors.

21. The electrical fault protection circuit of claim 15, wherein the power path monitor includes a current leakage monitor.

22. The electrical fault protection circuit of claim 15, further comprising a ground continuity monitor for detecting the ground continuity of the circuit.

23. The electrical fault protection circuit of claim 15, further comprising an elevated voltage monitor for detecting an elevated voltage at the load that is above a predetermined voltage and in response to the presence of such an elevated voltage will switch the interrupter from its connect position to its disconnect position.

* * * * *